INVENTOR
JOSEPH A. BACHMAN

Sept. 16, 1969   J. A. BACHMAN   3,467,332
CUTTING PLASTIC SHEETS TO TRAPEZOIDAL SHAPES
Original Filed June 30, 1965                4 Sheets-Sheet 4

INVENTOR
JOSEPH A. BACHMAN

BY Chisholm and Spencer

ATTORNEYS

United States Patent Office 3,467,332
Patented Sept. 16, 1969

3,467,332
**CUTTING PLASTIC SHEETS TO
TRAPEZOIDAL SHAPES**
Joseph A. Bachman, Greensburg, Pa., assignor to PPG
Industries, Inc., a corporation of Pennsylvania
Original application June 30, 1965, Ser. No. 468,541.
Divided and this application Jan. 5, 1967, Ser. No.
607,443
Int. Cl. B65h 19/20, 75/24; B26d 5/08
U.S. Cl. 242—56                                6 Claims

ABSTRACT OF THE DISCLOSURE

Reel for winding and cutting sheet material at any desired angle including peripherally spaced tubes disposed at each corner of a polygon and substantially diagonally spaced cutting means pivotally adjustable to any desired angle extending completely across the sheet to cut the sheet into desired shapes.

---

This application is a division of application Serial No. 468,541, filed June 30, 1965, and now abandoned.

This application relates to apparatus for cutting sheets of flexible plastic material into trapezoidal shapes, and particularly relates to producing a plurality of trapezoidally shaped sheets of plastic sheeting suitable as interlayers for laminated safety glass windshields from a continuous web of said material.

Recent designs of automobile windshields require the lamination of bent glass sheets that are substantially trapezoidal in outline. The plastic interlayers for such sheets are usually supplied in the form of a continuous web mounted on a roll. In the past such webs have been cut into rectangular shapes by rotating the web about a reel into several layers and cutting the layers transversely to form a series of rectangular sheets whose length approximated the outer perimeter of the reel. A considerable amount of plastic has been lost through trimming two triangular shaped portions from the opposite ends of the rectangular sheets to convert from rectangular to trapezoidal shapes.

The present invention provides apparatus for winding a plurality of layers of flexible sheet material about a reel from a web of continuous material. Then, the wound layers of the sheet material are cut from side to side at oblique angles to the length of the sheet at two diametrically opposed locations to form two nesting trapezoidal shapes from each perimetral layer of flexible sheeting wound about the reel.

The edges of the flexible sheeting are cut at an angle approximating the angle formed at the A-post of an automobile in which the finished windshield is installed. This oblique cutting saves approximately 1½ feet of length previously lost from each circumferential layer of plastic sheeting obtained using prior art methods.

In the past, trapezoidal shapes were produced by trimming the ends of rectangular or parallelogram shapes previously cut from each layer wound around a reel. At present prices for plastic interlayer material, it is estimated that the annual savings in plastic sheeting is $15,000 per year at only the first plant of the assignee to install this invention.

The benefits of the present invention will be understood more clearly in the light of a description of a particular embodiment thereof, to be described hereinafter.

In the drawings which form part of a description of the illustrative embodiment, and where like reference numbers refer to like structural elements, FIG. 1 is an end elevational view of apparatus illustrating the present invention, with parts in phantom;

Figure 1:
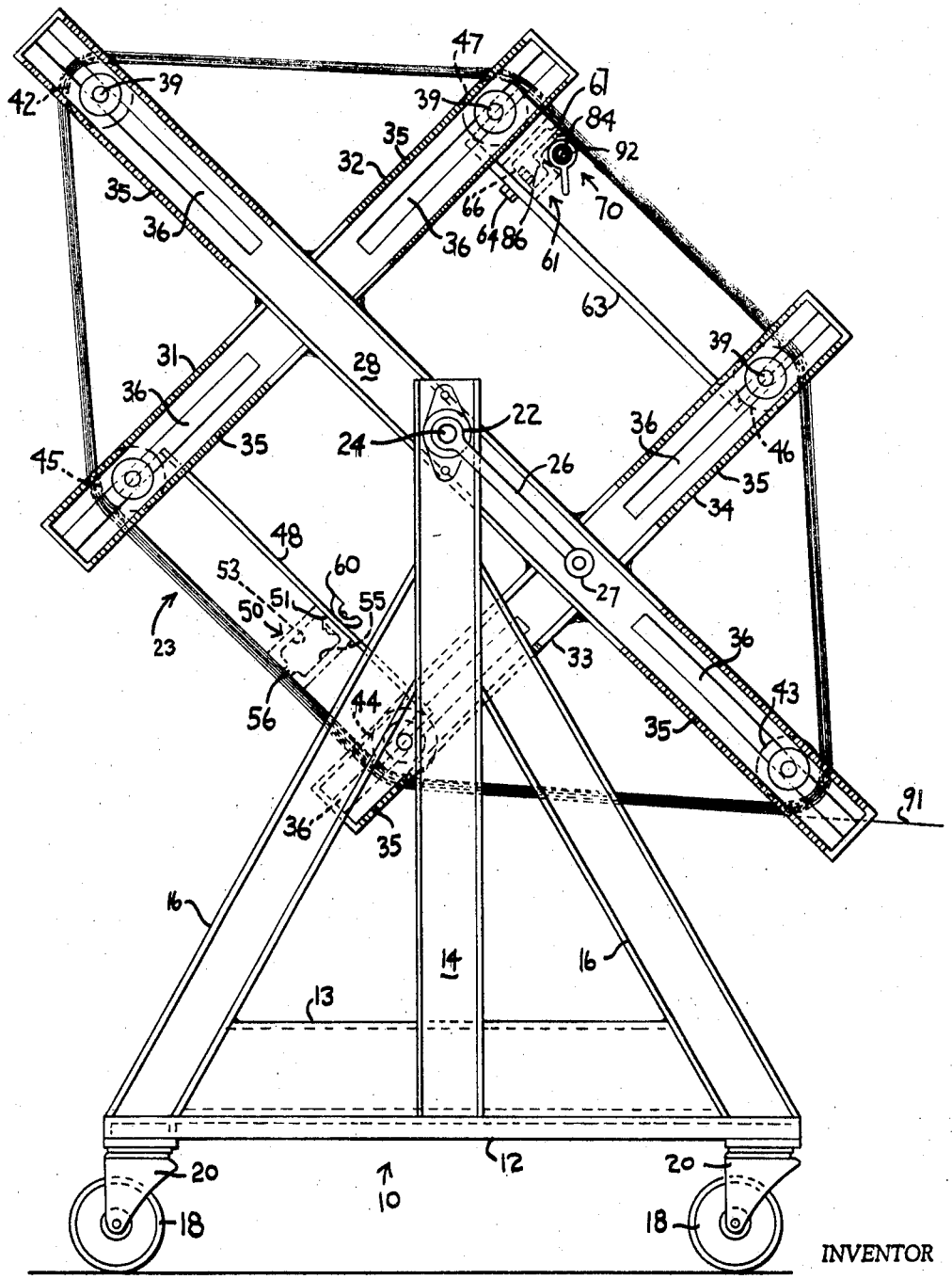

Referring to the drawings, a carriage, shown generally at 10, is provided with a horizontal base 12 that supports horizontally extending cross beams 13, parallel vertical supports 14 and 15 extending upward from their opposite ends and a pair of oblique braces 16 connecting the ends of cross beams 13 and the upper portions of the vertical supports 14 and 15. The carriage includes four wheels 18, each mounted on a wheel bracket 20 at each of the four corners of the base 12.

Each of the vertical supports 14 and 15 supports one of a pair of spaced pivot bearings 22. The two pivot bearings are axially aligned with one another to provide a pivot axis for reel means, shown generally at 23.

The reel means 23 comprises a shaft 24 pivotally mounted to the pivot bearings 22 along the pivot axis. A crank 26 (FIG. 2) having a crank handle 27 is attached to the shaft 24 to facilitate rotation of the reel means 23. A pair of parallel, elongated channel members 28 and 29 are rigidly attached to the shaft 24 to rotate therewith when the crank 26 is rotated. The elongated channel members 28 and 29 extend equal distances in opposite directions from the shaft 24.

To one side of the shaft 24, a pair of cross channels or arms 31 and 32 is attached to each of the elongated channel members 28 and 29. An additional pair of cross channels or arms 33 and 34 is attached to each of the elongated channel members 28 and 29 on the opposite side of the shaft 24 from that containing arms 31 and 32. Each of the elongated channel members and cross arms has a series of longitudinally spaced notches 35 in their spaced, longitudinally extending walls. Each web interconnecting the spaced walls of each channel or arm is provided with an elongated slot 36 approximately coextensive in length with the notched portions of the spaced walls and intermediate said walls.

Figure 3:
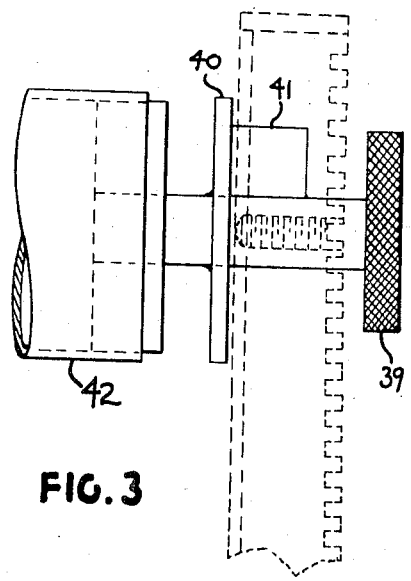
FIG. 3 is a fragmentary enlargement of a tube locking device forming part of the illustrative apparatus.
Figure 4:
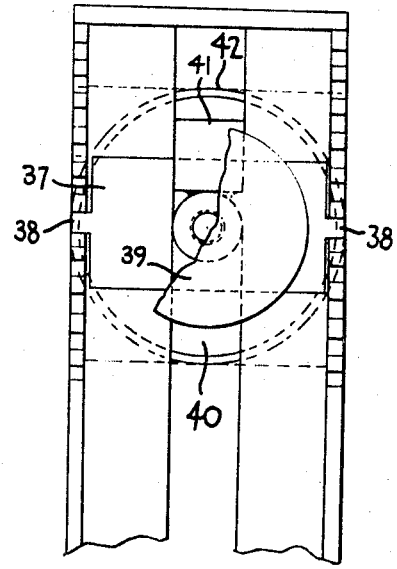
FIG. 4 is an end view of the device shown enlarged in FIG. 3 and taken along the lines IV—IV of FIG. 2.

Referring to FIGS. 3 and 4, a bracket 37 having teeth 38 at each end thereof is receivable in selected notches 35 of the notched wall portions of each of the channel shaped elongated members and cross channels or arms. Each bracket 37 in internally threaded to receive a screw lock 39, and has a back-up plate 40 that is wedged into abutment against the web of each of the channel shaped members or arms with a lug 41 extending through an associated elongated slot 36 to maintain proper alignment between each of the back-up plates 40 and the associated member 28 or 29 or arm 31, 32, 33 or 34.

A pair of cylindrical tubes 42 and 43 interconnect the back-up plates 40 secured to the ends of elongated channel shaped members 28 and 29. Additional tubes, 45, 47, 44 and 46 are similarly mounted rigidly to the ends of the spaced arms 31, 32, 33, and 34, respectively, extending outward from the elongated members 28 and 29. The tubes 42, 43, 44, 45, 46 and 47 are mounted in spaced relation about the outer perimeter of the reel 23 to present smooth surfaces to a sheet of flexible material to be wound thereon at the corners of a volume that has an essentially polygonal or more precisely, a hexagonal shape in cross-section.

A first arcuately slotted plate 48 and a first pivot supporting plate 49 interconnect tubes 44 and 45 at their opposite ends through welding to their inner sides. A first cutting member 50 is pivoted adjacent one end thereof to a first pivot 52 supported by the first pivot support plate 49. A first pointer 54 is attached to the outer radial end of the first cutting member 50.

The first cutting member 50 is an elongated housing of substantially rectangular cross-section comprising an inner wall 51, a pair of connecting walls 53 and 55, and an elongated slot 56 in its outer wall 57. The slot 56 extends in alignment with a line between the first pivot 52 and the first pointer 54 and provides a guide for moving a cutting tool across the entire width of layers of flexible material wound upon the reel 23. The inner wall 51 receives the pivot 52 at one end thereof and is free to pivot about said pivot when its other end is released.

The first arcuately slotted plate 48 has indicia 58 indicating the angle of pivoting in degrees for the first cutting member 50 about the first pivot 52 relative to a horizontal plane extending through the shaft 24 and the pivot 52 when the latter occupies a position in a horizontal plane passing through the shaft. A first lock nut 60 extends through an opening in the opposite end portion of the rear wall 51 from the end portion receiving the pivot 52 to secure the first cutting member 50 into any angular position desired based on the first pivot 52.

Figure 2:
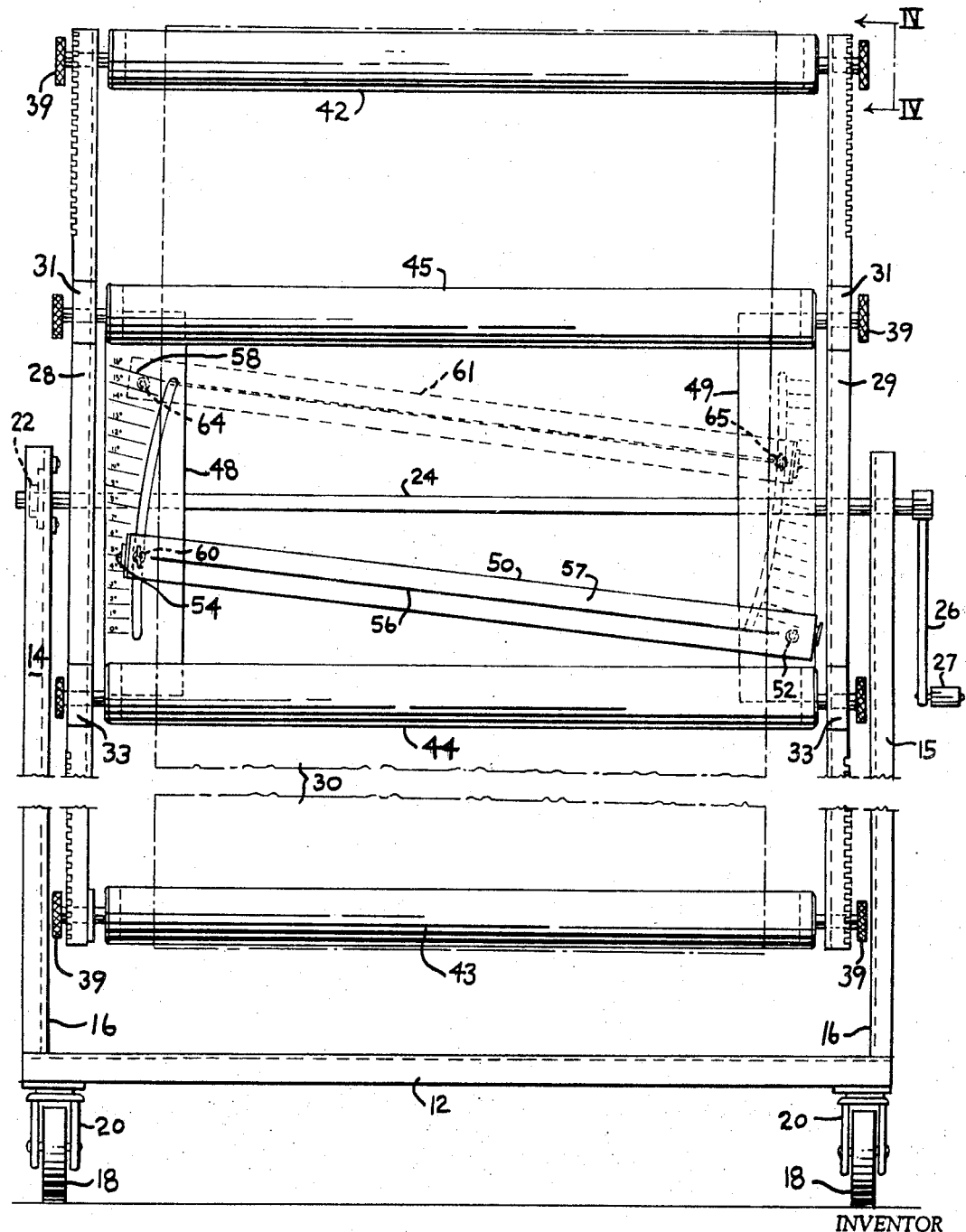
FIG. 2 is an elevational view transverse to the view of FIG. 1, after the apparatus has been rotated 45 degrees relative to the view of FIG. 1.

A second cutting member 61 is disposed diagonally opposite the first cutting member 50 with respect to the shaft 24. One end of the second cutting member 61 is adjustably secured to a second arcuately slotted plate 62 (disposed behind plate 49 as seen in FIG. 2). See FIG. 5. The other end of the second cutting member 61 is pivoted to a second pivot supporting plate 63. The latter is disposed behind the first arcuately slotted plate 48 as seen in FIG. 2.

The second pivot support plate 63 is provided with a second pivot 64 for pivoting the second cutting member 61 to said second pivot supporting plate 63. The second pivot 64 is diametrically opposite from the first pivot 52 but adjacent the vertical support 14, whereas the first pivot is adjacent vertical support 15. The opposite end portion of the second cutting member 61 is adjustably secured to the second pivot supporting plate 63 by a second lock nut 65. (FIGS. 2 and 5).

The second cutting member 61 in constructed in a manner similar to that of the first cutting member 50 with an inner wall 66 pivotally attached to plate 63 at one end portion and secured in an arcuate slot in plate 62 at its other end portion. It also has an elongated cutting slot 67 in its outer wall. However, one of its connecting walls is recessed to receive a clamp 70. The latter is the subject matter of a copending application Ser. No. 468,376 of William A. Castine, filed June 30, 1965.

Figure 5:
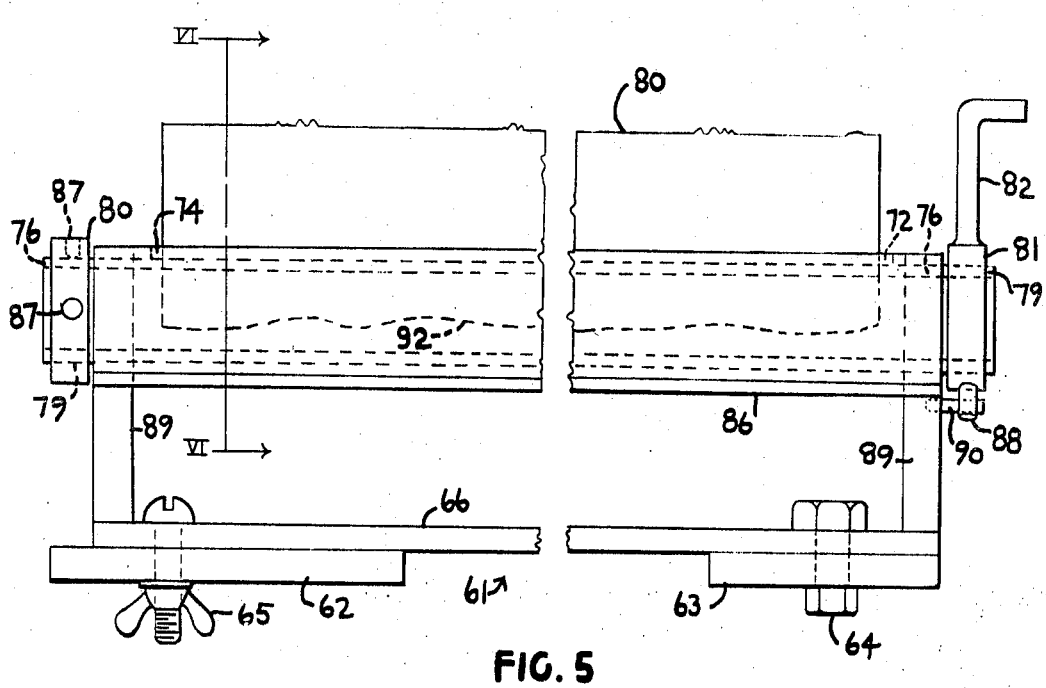
FIG. 5 is a fragmentary elevational view of a clamp comprising inner and outer slotted pipes coaxially aligned for securing an end portion of flexible sheeting for use with the present invention.
Figure 6:
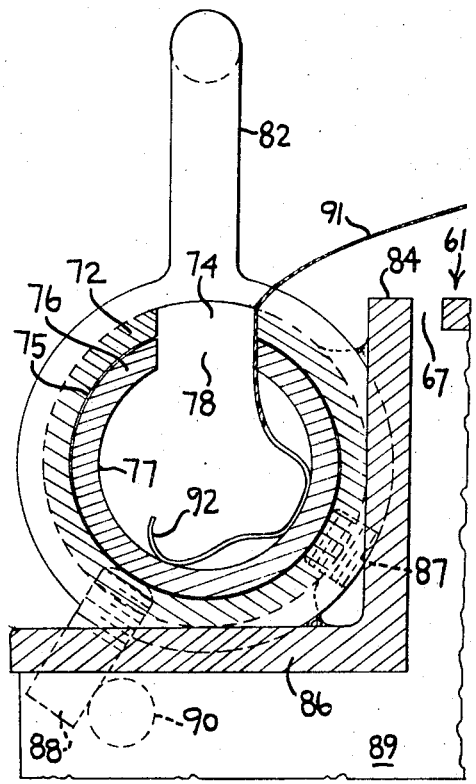
FIG. 6 and FIG. 7 are transverse sectional views along the line VI—VI of FIG. 5, FIG. 6 showing the pipes of the clamp in position to receive an end portion of flexible sheeting and FIG. 7 showing the pipes in position to clamp said end portion therebetween.
Figure 7:
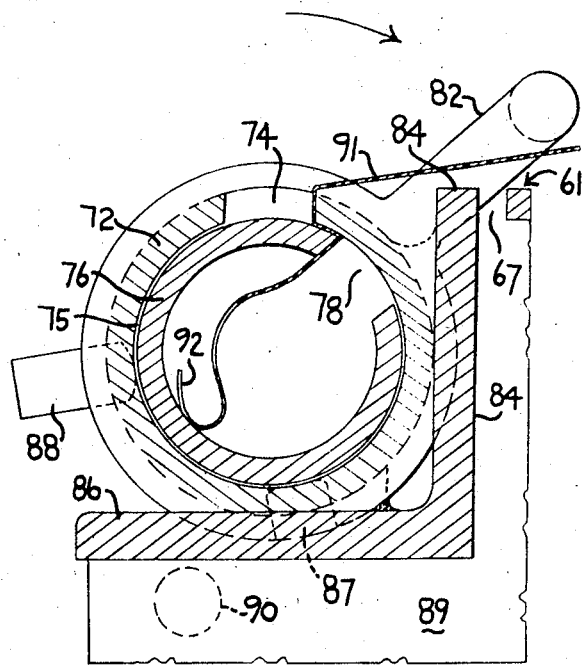

The clamp 70, shown in FIGS. 5, 6 and 7 in detail, is carried by the recess in the second cutting member 61 and comprises an outer pipe 72 having an elongated slot 74 extending axially thereof, and an inner pipe 76 having an elongated slot 78 of similar extent. The inner surface 75 of the outer pipe 72 is slightly spaced from the outer surface 77 of the inner pipe 76 to receive an end portion of plastic sheeting therebetween for clamping. The inner pipe 76 is secured to a pair of collars 80 at its ends 79 which extend beyond the ends of the outer pipe 72. The latter is fixed to the walls 84 and 86 of the recessed portion of the second cutting member 61. A handle 82 is provided to facilitate rotating the collar 80.

The collars 80 are locked to the inner pipe 76 by a series of peripherally spaced set screws 87 mounted in apertures in the collars 80. When the set screws are threaded inward, they make contact with the outer surface 77 of the inner pipe 76. Thus, when the collars 80 rotate with the handle 82, the inner pipe 76 rotates relative to the outer pipe 72.

One of the set screws 87 has an elongated head 88. One of the end walls 89 of the second cutting member 61 has a lug 90. The lug 90 extends axially outward from end wall 89 and is located in the path of movement of the elongated head 88. The position of the inner pipe 76 is so adjusted relative to the collars 80 and handle 82 that when the elongated slots 74 and 78 are in alignment, the elongated head 88 abuts lug 90.

The inner pipe 76 permits temporary storage of non-usable plastic from an end portion of a web so as to permit an end portion of non-linear configuration to be stored temporarily within the inner pipe 76 when the end portion of a sheet of material is inserted through elongated slots 74 and 78 until a portion of plastic sheeting suitable for cutting is reached.

In a typical operation, an end of a continuous web of plastic is unrolled from a supply roll and inserted through aligned elongated slots 74 and 78 of the outer and inner pipes 72 and 76, respectively. The end of the plastic web appears as in FIG. 6. Then, the inner pipe 76 is rotated relative to the outer pipe 72 as seen in FIG. 7. As the inner pipe rotates, the end portion of the plastic web 91 is securely clamped between the inner wall 75 of the outer pipe 72 and the outer wall 77 of the inner pipe 76.

The entire reel 23 is rotated by crank 26 and the plastic sheet is wound around the outer surfaces of the tubes 47, 42, 45, 44, 43 and 46 for several revolutions. As many as twenty layers of plastic sheeting may be cut at a single time.

The first and second cutting members 50 and 61 are shown in FIG. 2 adjusted to the desired angle to guide a cutting tool (not shown) along the elongated slots 56 and 67 to form forty trapezoidal sheets from twenty layers wound about the reel 23.

Figure 8:
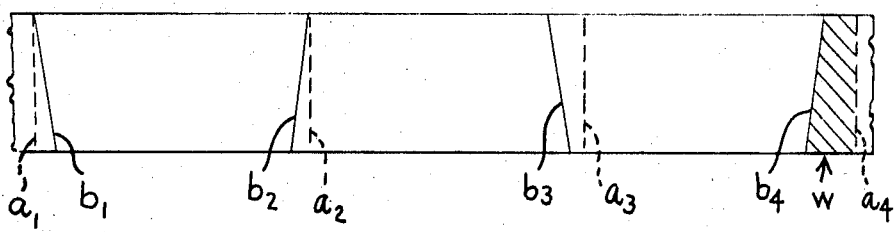
FIG. 8 is a plan view of a portion of a web of flexible sheet material showing how the present invention minimizes waste of sheet material when the web is cut on the bias to produce interfitting trapezoidal shaped sheets according to the present invention.

FIG. 8 compares the efficiency of the method of cutting windshield interlayers employing the present invention with the method used earlier. Previously, each layer was wound to a peripheral length approximating a windshield length and cut to rectangular shape by making successive cuts along dotted lines $a_1$, $a_2$, $a_3$, $a_4$, etc. The individual rectangular sheets so formed were then trimmed to produce the ultimate shape of the plastic interlayer. The present invention enables a continuous web to be cut diagonally along successive solid lines $b_1$, $b_2$, $b_3$, $b_4$, etc.

The shaded area $w$ to the right of FIG. 8 between the lines $b_4$ and $a_4$ shows the cumulative savings resulting from cutting interfitting trapezoidal shapes rather than rectanular shapes that require further trimming after only three sheets are formed.

The apparatus described above is especially suitable for use in preparing individual sheets of flexible plastic material such as plasticized polyvinyl butyral having an outline of trapezoidal shape for use as interlayers in laminated safety glass windshields for automobiles from a continuous web mounted on a roll. The interlayer material is usually assembled between a pair of curved glass sheets having an essentially trapezoidal outline to comply with the needs of automobile stylists.

The glass sheets are first bent in pairs and separated from one another for insertion of the plastic interlayer. Unless the interlayer is cut to the proper outline, it must be trimmed to conform to the outline of the matching bent glass sheets that have been temporarily separated from one another to permit insertion of the interlayer.

According to the method performed in accordance with the present invention, the continuous web of plastic material is unrolled from its supply roll and a number of layers, preferably about twenty, are wound in polygonal configuration having a perimeter approximately twice the length of a single windshield. After the layers are wound, the plastic material layers are cut simultaneously along oblique lines of cutting extending diagonally from side to side of the wound layers at opposite sides of the perimeter. This cutting produces a pair of interfitting sheets of trapezoidal shape for each layer of material. The difference in length of the perimeters of adjacent layers is slight because the material is only 15 to 30 mils thick and the material is so easily cut that twenty layers may be wound and cut simultaneously very readily, thus producing forty windshield interlayers having approximately the desired trapezoidal outline for each winding and cutting operation.

In cutting the sheet material, the reel 23 must be oriented so that the material is draped about one of the tubes 42 or 43 with substantially equal mass of cut portions on either side of the upper tube. The lower cut sheets drop below the reel while the upper cut sheets remain draped about the upper tube 42 or 43 until removed from the web.

Figure 9:
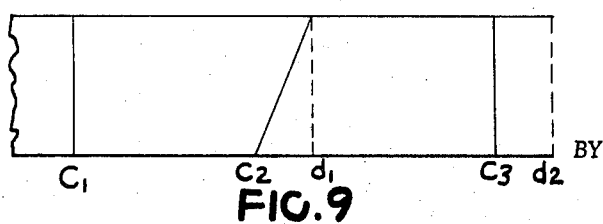
FIG. 9 shows how other non-rectangular patterns can be made more economically using the present invention.

FIG. 9 shows how a continuous web may be cut to produce other non-rectangular shapes. Laminated rear quarter station wagon windows have one oblique end edge and one end edge that is substantially normal to the longitudinal side edges of the window. It is a simple matter to set one cutting member at 0 degrees or whatever small oblique angle is needed and the other cutting member at whatever other oblique angle is desired. In this case, one of the pivot supporting plates must be provided with an additional pivot opening to receive the pivot in a position slightly offset from the diametrically opposite position required for interfitting trapezoidal shapes and rectangular shapes.

The cuts $c_1$, $c_2$, $c_3$, etc. provide the irregular shapes nested to one another. In comparison, the prior art cuts $d_1$, $d_2$, $d_3$, etc. would waste an area equal to the difference between the cuts $c_3$ and $d_2$ for each pair of discrete sheets cut.

It is understood that the present invention is also useful in producing twice as many discrete sheets of rectangular configuration as has been possible in the past due to the amount of excess that must be trimmed from the sheets formed from the outer layers due to the gradual increase in circumference as the layers build up. For sheets of 30 mil thickness, twenty layers is the maximum that can be accepted. Prior art devices made twenty sheets per winding. The present invention yields forty sheets per winding without increasing the excess that must be trimmed due to increase in circumference.

The form of the invention shown and described in this disclosure represents an illustrative preferred embodiment thereof. It is understood that various changes may be made without departing from the spirit of the invention as defined in the claimed subject matter which follows.

What is claimed is:

1. Apparatus for cutting sheets of flexible material into trapezoidal shapes from a continuous web of said material comprising a pair of axially spaced supports, pivot means carried by each of said axially spaced supports, said pivot means being axially aligned with one another, reel means pivoted to said pivot means to wind a plurality of layers of flexible material therearound, said reel means comprising tube support means for supporting a plurality of parallel tubes at the corners of a polygon transverse to said axis extending through said axially aligned pivot means about which said material is wound, means for adjusting the distance between each said tube and said axis to adjust the location of the corners of said polygon to fix the length of the perimeter of said polygon, a pair of cutting members supported in diametrically opposed relation to one another between adjacent tubes on diametrically opposite sides of said reel means, an elongated slot extending lengthwise of each of said cutting members for guiding a cutting tool longitudinally thereof, and means for adjusting the orientation of each of said elongated slots and said cutting members relative to its said adjacent reel to cut each of said layers into a pair of discrete interfitting trapezoidal sheets.

2. Apparatus for cutting sheets of flexible material into trapezoidal shapes from a continuous web of said material comprising a pair of axially spaced supports, pivot means carried by each of said axially spaced supports, said pivot means being axially aligned with one another, reel means pivoted to said pivot means to wind a plurality of layers of flexible material therearound, said reel means comprising tube support means for supporting a plurality of parallel tubes at the corners of a polygon transvere to said axis extending through said axially aligned pivot means about which said material is wound, means for adjusting the distance between each said tube and said axis to adjust the location of the corners of said polygon to fix the length of the perimeter of said polygon, a pair of cutting members supported in diametrically opposed relation to one another between adjacent tubes on diametrically opposite sides of said reel means, an elongated slot extending lengthwise of each of said cutting members for guiding a cutting tool longitudinally thereof, and means for adjusting the orientation of each said cutting members relative to its said adjacent reel to cut each of said layers into a pair of discrete interfitting trapezoidal sheets, wherein said means for adjusting the orientation of said cutting members comprises a first pivot for pivoting one of said cutting members relative to said reel means on one axial side thereof, a second pivot for pivoting the other of said cutting members to said reel means on the other axial side thereof, said pivots being displaced from one another approximately half the perimeter of said polygon, an arcuately slotted plate attached to said reel means on the axial side opposite each of said first and second pivots, and securing means for attaching each of said cutting members to an adjusted position along each of said arcuately slotted plates.

3. Apparatus for cutting sheets of flexible material into trapezoidal shapes from a continuous web of said material comprising a pair of axially spaced supports, pivot means carried by each of said axially spaced supports, said pivot means being axially aligned with one another, reel means pivoted to said pivot means to wind a plurality of layers of flexible material therearound, said reel means comprising tube support means for supporting a plurality of parallel tubes at the corners of a polygon transverse to said axis extending through said axially aligned pivot means about which said material is wound, means for adjusting the distance between each said tube and said axis to adjust the location of the corners of said polygon to fix the length of the perimeter of said polygon, a pair of cutting members supported in diametrically opposed relation to one another between adjacent tubes on diametrically opposite sides of said reel means, an elongated slot extending lengthwise of each of said cutting members for guiding a cutting tool longitudinally thereof, and means for adjusting the orientation of each said cutting members relative to its said adjacent reel to cut each of said layers into a pair of discrete interfitting trapezoidal sheets, wherein each of said cutting members has its elongated slot extending radially from one of said first and second pivots, and said arcuately slotted plate is provided with indicia indicating the angle of said slot relative to a plane extending through said axis and said first and second pivots.

4. Apparatus for cutting sheets of flexible material into interfitting trapezoidal shapes from a continuous web of said material comprising a pair of axially spaced supports, a shaft pivoted to said axially spaced supports, a pair of axially spaced elongated members fixed to said shaft and extending in opposite directions traversely of said shaft to rotate therewith, a tube support bracket fixed in adjustable position lengthwise of each said elongated members on each side of said shaft, a tube extending between each said tube support brackets carried by opposed elongated members on each side of each of said pivot means, a pair of arms extending outward in opposite directions transverse to the length of each of said elongated members and away from said shaft between each end of each of said elongated members and said shaft, a tube support bracket fixed in adjustable position lengthwise of each said arm, additional tubes extending between axially opposed tube support brackets carried by said arms, said tubes and said additional tubes extending parallel to said shaft and surrounding the latter to intersect the corners of a hexagon which said shaft also intersects, a first pivot supporting plate interconnecting axially aligned ends of a first adjacent pair of said additional tubes on one side of said apparatus, a first arcuately slotted plate interconnecting the other ends of said first adjacent pair of said additional tubes at the other side of said apparatus, a first cutting member pivoted at one end to said first pivot supporting plate and attached at its other end portion in adjustably secured position to said first acurately slotted plate, a second pivot supporting plate interconnecting axially aligned ends of a second adjacent pair of said additional tubes opposite said first adjacent pair at said other side of said apparatus, a second arcuately slotted plate interconnecting the other ends of said second adjacent pair of additional tubes at said one side of said apparatus, and a second cutting member pivoted at one end portion to said second pivot supporting plate and attached at its other end portion in adjustably secured position to said second acurately slotted plate, each said first and second cutting members being pivoted with an elongated slot extending lengthwise of said cutting member for guiding a cutting tool longitudinally thereof.

5. Apparatus as in claim 4, wherein each of said cutting members has a pointer aligned with its elongated slot, and said arcuately slotted plates are each provided with indicia indicating the angle of said slot relative to a plane extending through said shaft and said pivots.

6. Apparatus for cutting a continuous web of flexible material into discrete sheets comprising a reel comprising a central shaft and a plurality of spaced tubes surrounding said central shaft forming spaced portions of a peripheral support for supporting layers of said material wound about said reel, a first cutting means extending between a first pair of adjacent tubes, a second cutting means extending between a second pair of adjacent tubes, said second cutting means being approximately diametrically opposite said first cutting means, means for pivoting each said cutting means between its adjacent pair of tubes, and means for securing each said cutting means in any preselected pivoted position, whereby each layer of said material wound about said reel can be cut from side to side along any preselected angle of cutting to form two discrete sheets of siad material.

References Cited

UNITED STATES PATENTS

| | | | |
|---|---|---|---|
| 298,670 | 5/1884 | Crosby | 242—56 |
| 1,504,896 | 8/1924 | Murphy | 242—110.3 |
| 2,105,707 | 1/1938 | Stancliff | 242—56 |
| 2,801,471 | 8/1957 | Richardson | 83—563 |
| 503,341 | 8/1893 | Briggs | 83—648 |

ANDREW R. JUHASZ, Primary Examiner

JAMES F. COAN, Assistant Examiner

U.S. Cl. X.R

83—614, 648; 242—110.3